United States Patent [19]

Zeuner et al.

[11] 4,202,250
[45] May 13, 1980

[54] PROGRAMMED UNBALANCED LOAD VALVE SYSTEM

[75] Inventors: Kenneth W. Zeuner, Newtown; Alonzo B. Jarman, Wrightstown, both of Pa.

[73] Assignee: Control Concepts, Inc., Newtown, Pa.

[21] Appl. No.: 723,023

[22] Filed: Sep. 13, 1976

Related U.S. Application Data

[63] Continuation-in-part of Ser. No. 578,006, May 16, 1975, Pat. No. 3,980,002.

[51] Int. Cl.² ............................................. F15B 13/043
[52] U.S. Cl. ........................................... 91/449; 91/459; 137/596.12; 251/50
[58] Field of Search ............... 91/452, 449, 461, 459; 137/596.12; 251/50

[56] References Cited
U.S. PATENT DOCUMENTS

| | | | |
|---|---|---|---|
| 2,310,516 | 2/1943 | Clark | 251/30 X |
| 2,508,399 | 5/1950 | Kendrick | 251/50 X |
| 2,815,921 | 12/1957 | Bigelow | 251/30 X |
| 3,141,386 | 7/1964 | Loughridge | 251/44 X |
| 3,312,240 | 4/1967 | Ruchser | 137/596.12 |
| 3,508,468 | 4/1970 | Walter | 91/461 X |
| 3,770,240 | 11/1973 | Mito et al. | 251/50 X |
| 3,980,002 | 9/1976 | Jarman et al. | 251/30 X |

*Primary Examiner*—Irwin C. Cohen
*Attorney, Agent, or Firm*—Frailey & Ratner

[57] ABSTRACT

A valve system for an unbalanced load having a first two stage valve assembly operable for raising the load and a second two stage valve assembly for lowering the load. Each of the second stages has a poppet with a parabolic contour which is dimensioned with orifice parameters to provide substantially linear flow rate change when the second stage poppet moves for substantially zero flow jerk. In addition, the raise valve assembly has a pilot line coupled directly to the load so that high pressure oil is instantly available to actuate the second stage poppet. The lower valve assembly has a dashpot to decrease the rate of opening of that second stage poppet.

6 Claims, 4 Drawing Figures

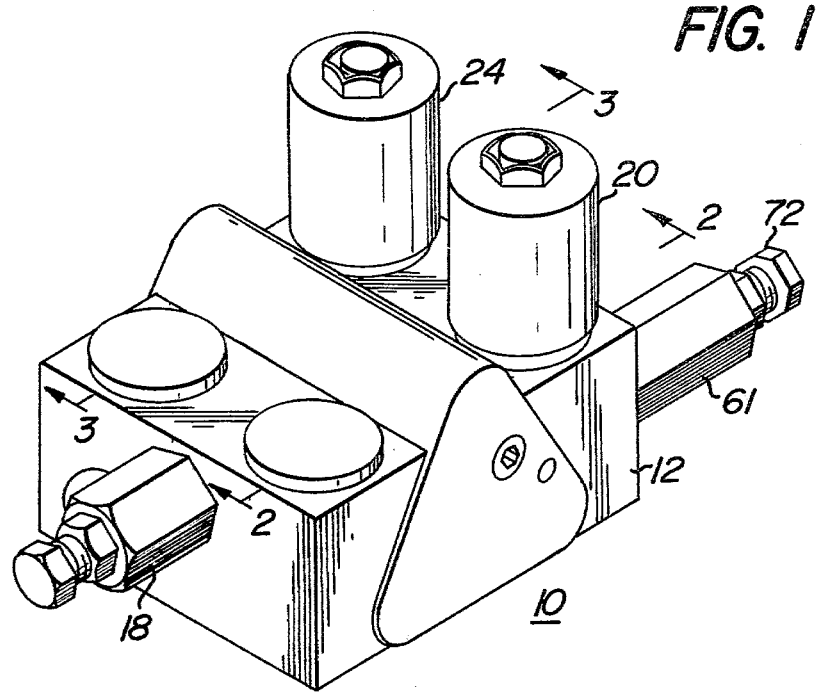

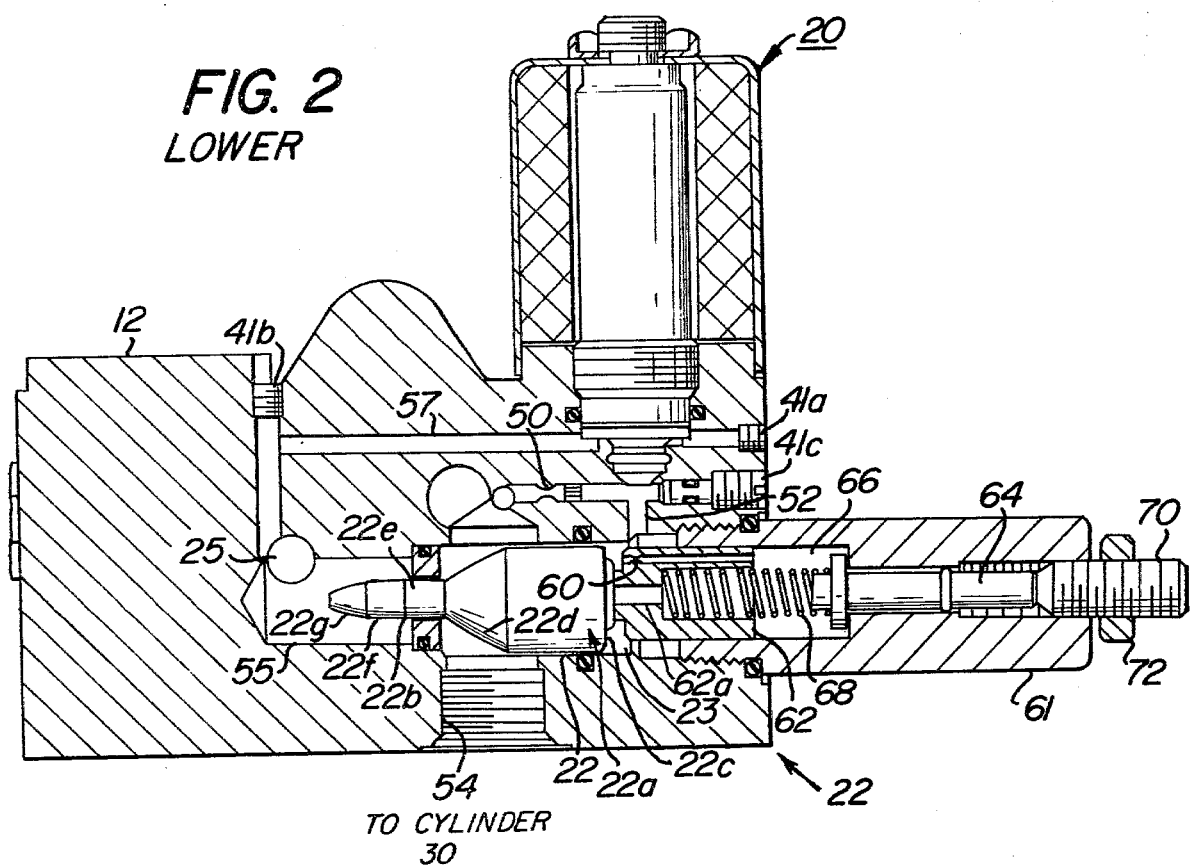
FIG. 2 LOWER
TO CYLINDER 30
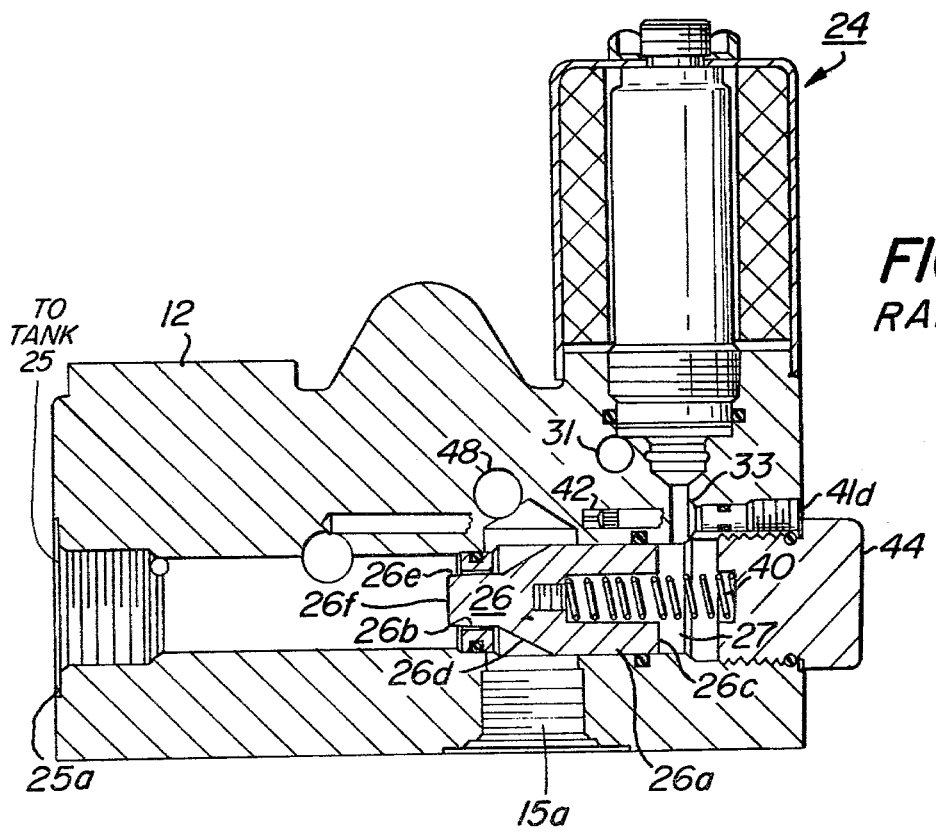
FIG. 3 RAISE

PROGRAMMED UNBALANCED LOAD VALVE SYSTEM

This is a continuation-in-part of application Ser. No. 578,006, filed May 16, 1975 now U.S. Pat. No. 3,980,002.

BACKGROUND OF THE INVENTION

A. Field of the Invention

This invention relates to the field of art of solenoid operated valve assemblies.

B. Prior Art

In prior valve systems, it has always been desirable for many applications that the valve open as rapidly as possible upon actuation and close as rapidly as possible upon actuation. However, with such rapid opening and closing, valve systems have produced undesirable fluid shock waves during the fluid flow transient stage following the opening or closing. When a valve opens, for example, the total amount of fluid is passed through a valve orifice and the fluid acts on a mass downstream causing an abrupt displacement of the mass. Specifically, the mass may be said to be instantly accelerated by the moving fluid which acceleration results in a "jerk" force defined as the time differential of the mass acceleration. Where the jerk applied to the mass is not zero, a shock is applied to the mass from the moving fluid which may produce stress or other damage to the mass or components.

This problem has been particularly important in the agricultural field as for example, in a combine which has very large springy tires. A combine carries a heavy header which may weigh, for example, 2,000 lbs. When the header is hydraulically moved, any shock waves which are produced are transmitted first to the chassis of the combine and then to the tires and results in extremely objectionable oscillations.

A further problem in combine operation has been that after finishing a row, it has been important that the header be rapidly raised and taken out of the row. In the rough terrain of the field, the combine must then be turned, realigned with the row and then the header rapidly lowered back into the field to begin a new cut. As the new cut is being made, the header must be adjusted at high speeds within fractions of an inch in order to maintain proper cutting height. The header must operate within a "dead band" the limits of which are required to be kept at a minimum as for example to one to one and a half inches. Within that narrow dead band, the header must operate and avoid overshoot and undershoot at normal cutting speeds. Thus, a single hydraulic system must provide not only rapid raising of a very heavy header load at the end of a row but also after the cut has been started, the hydraulic system must then accurately and carefully maintain a very narrow dead band at a desired ideal cutting height.

Accordingly, an object of the present invention is to minimize the dead band of a heavy load to maintain as close as possible the ideal cutting height of a header.

Another object of the present invention is to decrease the shock on the heavy load by means of the parabolic contour of the valve and the sizing of the orifices for providing substantially linear flow rate change when the valve moves thereby to provide substantially zero flow jerk.

SUMMARY OF THE INVENTION

A programmed valve system in combination with an unbalanced load and a fluid source having a raise and lower two stage valve assembly. The raise two stage valve assembly comprises a raise first solenoid operated pilot stage and a raise second valve stage. The lower two stage valve assembly has a lower first solenoid operated pilot stage and a lower second valve stage. Each of the second stages has a chamber divided into inlet and outlet sections. The load is coupled to the lower inlet section. Raise and lower second stage poppets each have an outer substantially parabolic contour to provide a predetermined flow area between the respective orifice and the parabolic contour. The raise and lower pilot stages are respectively coupled to the raise and lower second stages only by fluid communication whereby the respective raise and lower second stage poppets are controlled in closing with substantially linear flow rate change with poppet within orifice for minimized shock when the respective pilot is actuated to the closed position. The inlet section of the raise second stage is coupled to the fluid source and dashpot means is provided for the lower second stage poppet. The dashpot means has a chamber and an unrestricted conduit coupled between the chamber and a dashpot opening formed on an outer surface of the dashpot. The dashpot opening is closed only when engaged by the lower second stage poppet. In this manner the lower second stage poppet when moving to the open state engages and closes the dashpot opening and pushes the dashpot means to compress fluid in the dashpot chamber thereby damping the rate of opening of the lower second stage poppet. When moving to the closed state, the lower second stage poppet disengages from and opens the dashpot opening and thus the lower second stage poppet is free of and no longer damped by the dashpot means for a substantially rapid closing.

BRIEF DESCRIPTION OF THE DRAWINGS

FIG. 1 is a perspective view of a pair of two stage valve assemblies of the present invention;

FIG. 2 is a sectional view of the valve assembly of FIG. 1 taken along lines 2—2;

FIG. 3 is a sectional view of the valve assembly of FIG. 1 taken along lines 3—3; and FIG. 4 is a schematic drawing of the valve assembly of FIG. 1 together with an unbalanced load and a pump.

DETAILED DESCRIPTION

Referring now to FIGS. 1-4, there is shown a valve system 10 for producing fluid flow having a predetermined flow profile. As shown in FIG. 2, valve system 10 includes within a body 12 a two stage valve section for lowering the load. This lower valve section comprises a first stage solenoid operated pilot valve 20 and a second stage 22. In addition, valve system 10 includes a two stage raise and unload valve section as shown in FIG. 3 which comprises a first stage solenoid operated pilot valve 24 and a second stage 26. Pilot valves 20 and 24 are each shown as normally closed solenoid operated valves and are described in detail, for example, in U.S. Pat. No. 3,737,141.

In valve system 10, the fluid hydraulically moves a gravity load or weight 35 shown in FIG. 4 through a predetermined distance with a minimum of shock. Specifically, the dimensions of the contour of second stage poppets 22a and 26a and the valves of the orifices have been "programmed" to a particular application to provide substantially linear flow rate change. In this manner, in the raise or lower function, there is provided substantially zero flow jerk of weight 35. Jerk is defined here as the third derivative of distance with respect to time or the time rate of change of acceleration. In general, valve system 10 provides a predetermined flow profile of fluid passing through the lines to hydraulically move weight 35 with a minimization of shock.

Weight 35 may be a header for a combine of the type previously described where the header is moved by means of a cylinder 30 having a piston 30a. In this manner, cylinder 30 has a gravity load provided by header 35 and the combination may be defined as an unbalanced gravity load 30.

As best shown in FIG. 4, cylinder 30 is coupled (1) by way of main line 54 under poppet 22a (to the left as shown in FIG. 2), (2) by way of main line 52, check valve 59 and line 48 to pump 15, (3) by way of a pilot line to a load relief valve 37 and (4) through a fixed restricted orifice 50 to pilot valve 20. In addition, cylinder 30 is coupled by way of line 31 to pilot valve 24 where line 31 is a direct pilot line from the load to valve 24 used in raising weight 35. As shown, pump 15 is also coupled by way of a main line 15a under poppet 26a (to the left as shown in FIG. 2) and thence to tank 25. Pump 15 is also coupled through a pressure relief valve 38 to tank 25. Accordingly, as shown, pilot valve 20 controls flow between pilot line 57 coupled to tank and pilot line 52 which is coupled to chamber 23 of valve 22. Pilot valve 24 controls flow between load piloting line 31 and pilot line 33 coupled to chamber 27 of valve 26.

For the description of operation, the quiescent or idle state before raise of weight or header 35 will first be discussed. Pilot raise valve 24 and pilot lower valve 20 are both assumed to be in their closed state as illustrated in FIG. 4. Thus, there is no pilot pressure in chamber 27 since pilot 24 is closed and precalculated and nonvariable restricted orifice 42 is open to tank. Accordingly, poppet 26a is only provided with back pressure from the spring force of spring 40, FIG. 3 and thus valve 26 is in its illustrated open state.

When the solenoid of valve 24 is energized, system 10 leaves the idle state and valve 24 moves to its open state in which fixed, precalculated restricted orifice 24a is now coupled to pilot line 31. Accordingly, high pressure oil from load 30 is transmitted by way of line 31, restricted orifice 24a and line 33 to chamber 27. The availability of this high pressure fluid from the load allows for the rapid closure of poppet 26a against the inlet pressure by way of line 15a. It is in this way that high pressure oil from load 30 is instantly available to valve 26 upon energization of valve 24. As valve 26 closes, pressure is provided on line 48 through check valve 59 onto line 52 and in this manner to raise header or weight 35.

In other embodiments, when pilot pressure has previously been taken from the inlet side, the raise action has not been as instantaneously available. As a result of the initial differential pressure, only until the second stage started to close and caused an additional drop across the valve would such drop be available as pilot pressure.

From the foregoing description of obtaining pilot pressure for valve 26 directly from the high pressure fluid of load 30, it has been assumed that weight 35 has been in some raised normal operating (nongrounded) position. For example, where system 10 is used for the height control of a header 35, the header is constantly being maintained a certain distance off the ground as for example, one and a half inches. Thus, cylinder 30 normally provides a source of high pressure oil for piloting valve 26.

However, for the initial start condition with piston 30a grounded, it will be understood that there is no high pressure oil in line 31. Check valve 59 has a low spring force and thus if the source of high pressure fluid, viz, pump 15 is at 50 psi, the raise of weight 35 takes place in the following manner. The fluid pressure of pump 15 is sufficient to maintain piston 26 in its raised position and to open check valve 59 and provide a flow of fluid through pilot lines 31 and 33 and through actuated valve 24 to begin to close poppet 26a. As poppet 26a closes, there is a resultant increase in the pressure in line 31 thereby closing second stage poppet 26a and raising weight 35.

It will be understood that poppet 26 has a stub left hand or lower end 26f. Accordingly, poppet 26a provides extremely low back pressure with a full open orifice 26b in the pump idle state. Upon a raise command and actuation of pilot valve 24, poppet 26a moves towards its seat 26b. At the time that the square shoulder 26e-f enters orifice 26b, pressure is stepped up from pressure 50 psi to a predetermined pressure. This predetermined pressure is a function of the net area which is left between poppet 26a and orifice 26b which is a pressure very close to a balance pressure of weight 35 on load piston 30a.

As shown in FIG. 3, the contour of poppet 26 gradually increases the pressure to prevent shock (as later described in detail) as check valve 59 opens. On the other hand, poppet 22a of second stage raise valve 22 is never out of orifice 22b and thus does not act as a double acting nose of poppet 26a. It will be understood that both contours of poppets 22 and 26 are approximately parabolic. It will further be understood that the pressure on valve 26 is able to rapidly raise to approximately the balance pressure to eliminate dead time and then as a result of the contouring of poppet 26a to eliminate shock after that pressure has been reached. It is in this manner that the contour of poppet 26a is matched to the bias load.

It is important to point out that with pilot valve 24 closed, there is only tank pressure applied to chamber 27. In this manner, there is provided the lowest possible pump back pressure during this state. A low pump back pressure is advantageous to avoid overheating pump 15. Even with this low pump back pressure for the idle state, if it is necessary to raise weight 35 or header to avoid an obstacle, for example, high pressure fluid in line 31 is immediately available through valve 24 to initiate the closing of valve 26. In this way high pressure fluid from pump 15 is immediately provided through check valve 59 to actuate load 30 thereby to raise weight 35.

As previously described, weight 35 is raised during the time of energization of the solenoid of valve 24. Upon deenergization of this solenoid, the idle or quiescent state is resumed. In the idle state, pilot valve 20 is closed and high pressure oil freely passes through fixed, precalculated restriction 50 and line 52 so that a full pressure from load 30 is available in chamber 23, to the right of poppet 22a as shown in FIG. 2. In this manner, second stage raise valve 22 is maintained in the closed position illustrated in FIG. 4.

Upon energization of the solenoid of pilot valve 20, there is provided flow through precalculated restricted orifice 20a and pilot line 57 to tank 25 thereby establishing a flow across restricted orifice 50. In this manner, the pressure in chamber 23 is decreased and system pressure in line 55 to the left of poppet 22a, FIG. 2, is effective to move poppet 22a away from orifice 22b and allow fluid to flow through lines 54, 55 from load 30 to tank 25.

In this way, header 35 is lowered until the idle state is resumed by deenergization of pilot valve 20. Orifice 22 may be considered an adjustable orifice 56 for the reasons later to be described.

As shown in FIG. 2, a dashpot 62 is provided to the right of poppet 22a forming one wall of chamber 23. The purpose of dashpot 62 is as follows. As previously described, weight 35 may be a grain header on a combine which weighs for example, 2,000 lbs. The header works within a dead band of one to one and a half inches and within that dead band, system 10 is satisfied and there is no electrical actuation of valves 20, 24. In the manner previously described, a very high response is achieved in the raise condition by valves 24, 26 by means of load piloting. With respect to the lower condition, it is desired to provide system 20 with a high velocity capability when required to within the desired dead band. However, as the combine travels down the field and with the header being so heavy, there has resulted a substantial undershoot. Specifically, when the header was lowered, it would pass below the lower point of the dead band. The automatic controls of the combine (not shown) immediately initiate a raise condition and thus, the header would go into oscillation. In order to damp out such undershoot, a dashpot assembly is provided as shown in FIG. 2 in order to decrease the rate of opening poppet 22a.

Specifically, when poppet 22a moves to the right away from orifice 22b, the right hand face 22c thereof pushes against the left hand face of cylindrical dashpot 62. Dashpot 62 is spring biased by a spring 68 coupled at its right hand and to an adjusting plunger 64. Dashpot 62 has a chamber 66 within which fluid is compressed. As that fluid is released from chamber 66 by way of line 60 (having a flow restriction) into chamber 23. In this manner, poppet 22a is restricted in time in the speed in which it opens or moves to the right away from orifice 22b. Accordingly, dashpot 62 is effective to restrict and dampen the opening of poppet 22a thereby to dampen the lowering of header 35.

It will be understood that there is no restriction on the closing of poppet 22a since as poppet 22a moves to the left it is free to separate from dashpot 62. When poppet 22a separates from dashpot 62 fluid is allowed to freely flow from chamber 23 through unrestricted conduit 62a into chamber 66. In this manner, spring 68 is allowed to reset dashpot 62 for the next open command to lower header 35.

Adjusting plunger 64 and spring 68 are received within an adjusting plug 61 threadedly engaged within body 12. As shown, a lock set screw 70 and lock nut 72 provide a convenient way to adjust plunger 64 and thereby to adjust the maximum travel of poppet 22a. In this manner, there is established the maximum flow from cylinder 30 through orifice 22b into line 55. This structure may be considered an adjustable orifice which is represented in FIG. 4 as adjustable orifice 56. The adjustment may be made as headers 35 are changed and the operator is thus able to adjust the maximum down velocity of the header to maintain a safe limit.

As previously described, poppets 22a and 26a each have substantially parabolic contours with an outer, smooth, imperforate continuous surface. Thus for the flow of fluid with respect to these contours there is provided a constant acceleration of weight 35. For example, with respect to poppet 22a, the movement of this poppet from a second stage closed state to a second stage open state provides a linearly increasing velocity with respect to time resulting in a constant acceleration of weight 35. When poppet 22a reaches the top of the stroke, (or the extreme right hand position of FIG. 2) the mass displacement is linear with respect to time and the velocity of weight 35 is constant and the acceleration is zero.

At a predetermined time, pilot valve 20 may be actuated and poppet 22a begins to close orifice 22b and the fluid flow rate through line 55 decreases. It is to be understood that weight 35 continues in the same directional displacement as previously described. However, the velocity of weight 35 linearly decreases within the time interval resulting in a constant deceleration throughout the remaining mass movement distance.

Taking the derivative of acceleration with respect to time through the foregoing, three time intervals relates in a jerk substantially equal to zero. This characteristic leads to a minimization of shock applied to weight 35.

This operation may also be applied to poppet 26a with respect to the time that the parabolic contour is effective with respect to the fluid flow.

For the purpose of this description, it will first be assumed that in an initial state mass 35 is at rest and is not being moved. In this state, valve 22 is closed. Flow passes through flow restriction 50 and into chamber 23 to apply a force on poppet 22a to maintain it in a closed state. In this initial state, pilot 20 is closed and no flow passes through restricted orifice 20a.

At the beginning of the opening state, an energizing signal is applied to the solenoid of valve 20 and flow is then initiated through fixed restriction 20a as well as from chamber 23 through line 52. Contoured poppet 22a moves away from seat 22b and fluid passes through orifice 22b between the contour of plug 22a and the orifice walls. The opening time may be written:

$$T_o = \frac{V_{uc}}{Q_2 - Q_1} \tag{1}$$

where:
$T_o$ = Opening time (seconds)
$V_{uc}$ = Volume of chamber 23 (in$^3$)
$Q_2$ = Flow rate through outlet flow restriction 20a (in$^3$/Sec.)
$Q_1$ = Flow rate through inlet flow restriction 50 (in$^3$/Sec.)

As seen in equation 1, the total opening time is the volume of chamber 23 divided by the net flow out of the chamber. The values for each of the flow rates $Q_2$ and $Q_1$ may be written as a function of pressure differences as follows.

$$Q_1 = k_1 a_1 \sqrt{P_1 - P_2} \tag{2}$$

$$Q_2 = k_1 a_2 \sqrt{P_2 - P_3}$$

where $k_1$ = orifice constant empirically deviced (Typically 100 for 5606 hydraulic oil at 100° F.)
$a_1$ = inlet restriction member 50 area (in$^2$)
$P_1$ = pressure of fluid through inlet line 54 (Lb/in$^2$)
$P_2$ = pressure of fluid within upper chamber 23 (Lb/in$^2$)
$P_3$ = pressure of fluid in outlet line 55 (Lb/in$^2$)

In general the pressure in outlet line 55 ($P_3$) is lower than pressures $P_1$ and $P_2$ and is nominally considered as a reference level. For simplicity in these calculations, the reference level will be considered as zero. Since, during the opening state where poppet 22a is sweeping through its stroke, a force balance above and below poppet 22a must exist, it is seen:

$$P_1(A_p - A_o) = P_2 A_p \qquad (3)$$

where
$A_p$ = area of poppet upper surface 22c (in$^2$)
$A_o$ = area of orifice 22b (in$^2$)
Defining an area ratio as:

$$A_R = \frac{A_p - A_o}{A_p} \qquad (4)$$

and inserting into equation 3, it follows that chamber 23 pressure may be written:

$$P_2 = A_R P_1 \qquad (5)$$

Inserting equation 2 into equation 1 and further assuming that tank pressure $P_3$ is substantially negligible, the opening time may be written:

$$T_o = \frac{V_{uc}}{(k_1 a_2 \sqrt{P_2}) - (k_1 a_1 \sqrt{P_1 - P_2})} \qquad (6)$$

combining equation 6 with equation 5 yields:

$$T_o = \frac{V_{uc}}{k_1 a_2 \sqrt{A_R P_1} - k_1 a_1 \sqrt{P_1 - A_R P_1}} \qquad (7)$$

It is therefore seen, that for a given inlet pressure condition ($P_1$) a wide variety of opening times may be achieved by selecting appropriate orifice areas ($a_1$ and $a_2$) for flow restriction members 50, 20a.

Once poppet 22a has opened fully, a full second stage open state has been achieved and constant flow through outlet line 55 will displace mass 35 at a constant velocity with substantially zero acceleration effects.

In order to bring mass 35 to a maximum displacement with minimum shock, solenoid valve 20 is opened at a predetermined time. Poppet 22a is forced to a closed position. Assuming poppet 22a is in a fully opened position, then the closing time may be written in the following manner:

$$T_c = U_{uc}/Q_1 \qquad (8)$$

where:
$T_c$ = closing time (sec.)

The closing time is simply the upper chamber 23 volume divided by the flow rate through flow restriction 50. Combining equation 8 with equations 2 and 4, it is seen that:

$$T_c = \frac{V_{uc}}{k_1 a_2 \sqrt{P_1 - A_R P_1}} \qquad (9)$$

Therefore, given a particular inlet pressure condition, a multiplicity of closing times may be obtained by selecting the proper value of restriction area ($a_1$).

Poppet 22a has been constructed in substantially parabolic contour. Such contours are formed empirically and are useful for particular opening times. Parabolic contours have been used for opening and closing times in excess of 0.5 seconds. This long stroke times have been achieved when stroke 40 has been made longer than 0.25 times the diameter of orifice 24. Other low shock solenoid actuated valves 10 have been constructed with opening times between 25 and 50 milliseconds.

In FIG. 1, it will be seen that a relief valve 18 is provided which is coupled to pressure line 48. Further, as shown in FIGS. 2, 3, fixed or seal plugs 41a-d are provided. In FIG. 3, a hex head plug 44 is threadedly engaged in body 12. Plug 44 fixedly receives one end of spring 40 the other end of which biases poppet 26a.

What is claimed is:

1. A programmed valve system in combination with an unbalanced load means and a fluid source having a raise and lower two stage valve assembly comprising
said raise two stage valve assembly comprising a raise first solenoid operated pilot stage, a raise second valve stage having a chamber and divided into inlet and outlet sections, a raise second valve stage orifice between the sections within which a raise second stage poppet reciprocates,
said lower two stage valve assembly comprising a lower first solenoid operated pilot stage, a lower second valve stage having a chamber and divided into inlet and outlet sections, a lower second valve stage orifice between the sections within which a lower second stage poppet reciprocates, said load means being coupled to said lower inlet section,
said raise and lower second stage poppets each having an outer substantially parabolic contour to provide a predetermined flow area between the respective orifice and parabolic contour, said first raise and lower pilot stages being respectively coupled to said raise and lower second stages only by fluid communication and whereby said respective raise and lower second stage poppets are controlled in closing with substantially linear flow rate change with poppet within orifice for minimized shock when the respective pilot stage is actuated to the valve closed position,
means coupling said inlet section of said raise second valve stage to said fluid source, and
dashpot means for said lower second stage poppet and having a chamber and an unrestricted conduit coupled between said chamber and a dashpot opening formed on an outer surface of said dashpot means, said dashpot opening being closed only when engaged by said lower second stage poppet whereby said lower second stage poppet (1) when moving to said open state engages and closes said dashpot opening and pushes said dashpot means to compress fluid in said dashpot chamber thereby damping the rate of opening of said lower second stage poppet and (2) when moving to said closed state disengages from and opens said dashpot opening and said lower second stage poppet is free of and no longer damped by said dashpot means for a substantially rapid closing.

2. The programmed valve system of claim 1 in which there is provided means for maintaining normally open said raise pilot stage during the rest state and means for maintaining normally closed the lower pilot stage during the rest state, and means coupling the outlet sections of said raise and lower second valve stages to a fluid tank.

3. The programmed valve system of claim 1 in which said dashpot means includes means for biasing said dashpot means to the reset state whereby when said lower second stage poppet moves to said closed state and opens said dashpot opening said dashpot means is rapidly reset.

4. The programmed valve system of claim 3 in which said dashpot means comprises a cylindrical dashpot having a centrally located dashpot chamber, the unrestricted conduit being coupled between said dashpot chamber and an opening on said outer surface of said dashpot, said dashpot opening being closed by engagement with a face of said lower second stage poppet remote from said lower second stage orifice, said dashpot having a restricted orifice for restricting the flow of fluid out of said dashpot chamber when said second stage poppet moves to said open state thereby closing said dashpot opening and pushing said dashpot to compress fluid in said chamber damping the opening of said second stage poppet.

5. The programmed valve system of claim 1 in which each said pilot stage includes plug means responsive to solenoid energization and movable between a valve open position and a position for seating in and closing said inlet orifice.

6. The programmed valve system of claim 5 in which said second stage poppet has a stub noise which in the open position is disposed out of but very close to said second stage orifice thereby to provide a substantially low back pressure for said fluid source whereby pressure rapidly increases when said first pilot stage is actuated to the closed position to close said second stage poppet and thereby raise said piston.

* * * * *